(12) United States Patent
Xiques

(10) Patent No.: US 8,801,064 B2
(45) Date of Patent: Aug. 12, 2014

(54) PORTABLE FISHING ROD HOLDER WITH LEGS AND STAND

(71) Applicant: Francisco Javier Xiques, Miami, FL (US)

(72) Inventor: Francisco Javier Xiques, Miami, FL (US)

( * ) Notice: Subject to any disclaimer, the term of this patent is extended or adjusted under 35 U.S.C. 154(b) by 0 days.

(21) Appl. No.: 13/667,145

(22) Filed: Nov. 2, 2012

(65) Prior Publication Data

US 2014/0125075 A1    May 8, 2014

(51) Int. Cl.
*A45F 5/00*     (2006.01)
*A01K 87/00*    (2006.01)

(52) U.S. Cl.
USPC .......................................... 294/143; 43/54.1

(58) Field of Classification Search
USPC ............. 294/143, 140, 141, 142; 43/21.2, 22, 43/25, 54.1; 211/70.8; 248/68.1
See application file for complete search history.

(56) References Cited

U.S. PATENT DOCUMENTS

| | | | |
|---|---|---|---|
| 6,651,374 B1 * | 11/2003 | Ridlen ........................... | 43/21.2 |
| 7,555,861 B1 | 7/2009 | Zakarian | |
| 7,946,076 B2 * | 5/2011 | Gascoigne ....................... | 43/4.5 |
| 2005/0257417 A1 * | 11/2005 | Black et al. .................... | 43/21.2 |
| 2006/0265934 A1 * | 11/2006 | Morris ........................... | 43/21.2 |
| 2007/0278166 A1 * | 12/2007 | Morton ......................... | 211/70.8 |
| 2008/0294383 A1 * | 11/2008 | Parmar et al. ................. | 702/186 |

* cited by examiner

*Primary Examiner* — Paul T Chin

(57) ABSTRACT

A portable fishing rod holder for housing fishing rods can be used during transportation to and from fishing. The portable fishing rod holder can hold multiple fishing rods. The combination of a deep cut rod holder and an extra-long handle allow the rods to be carried in a perfect diagonal position, lower and closer to the user for increased comfort and user maneuverability, as well as for increased protection of rods and reels. The portable fishing rod holder has built-in legs, a home stand option, and the ability to hold and carry larger rods with conventional reels.

14 Claims, 4 Drawing Sheets

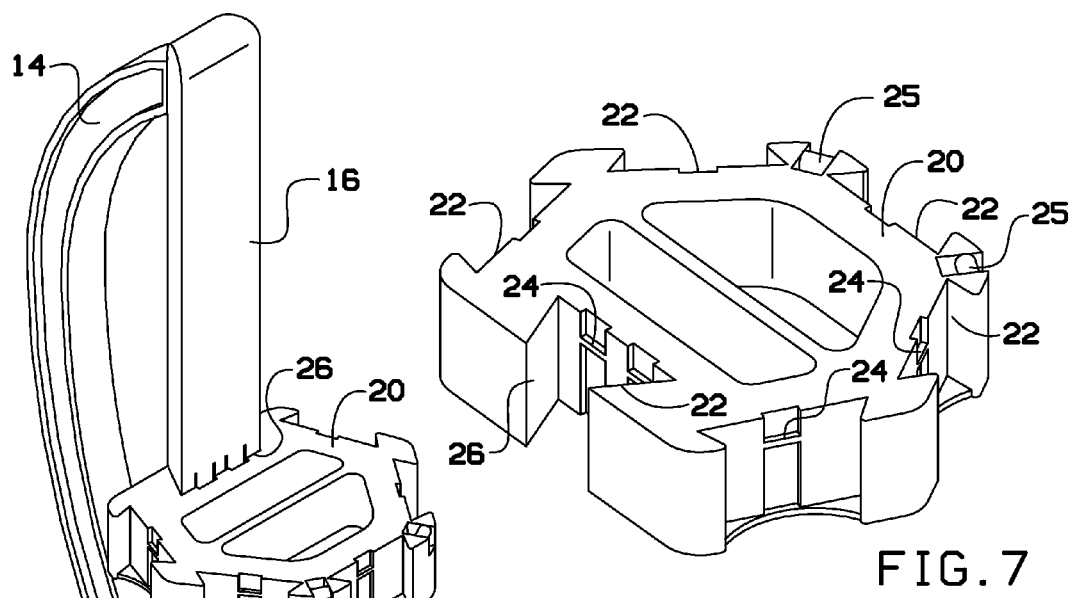
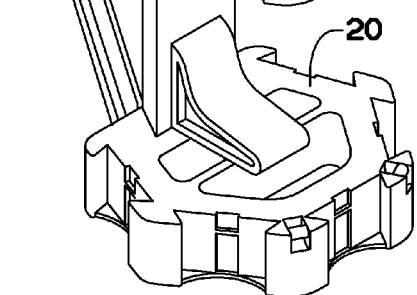
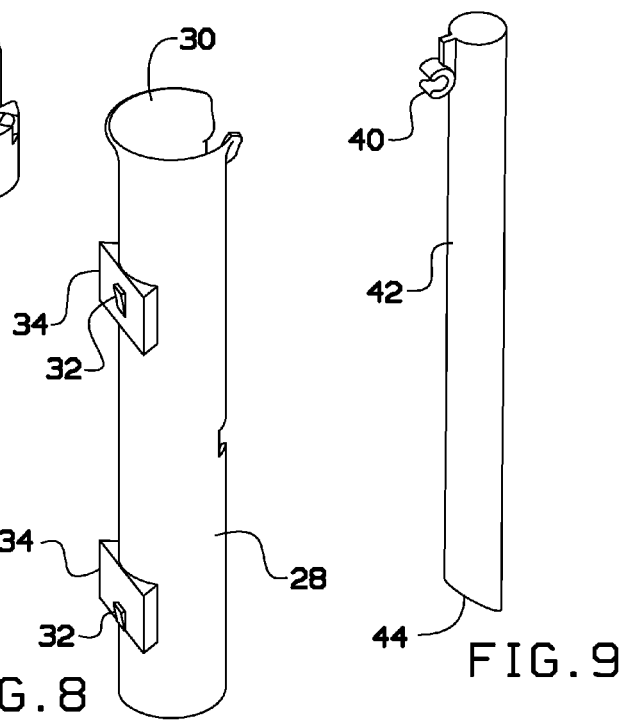

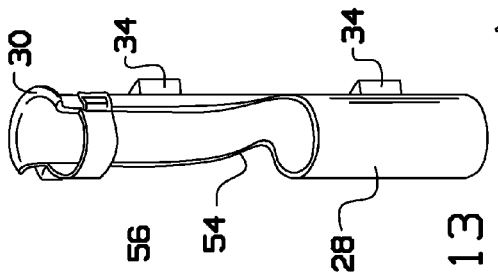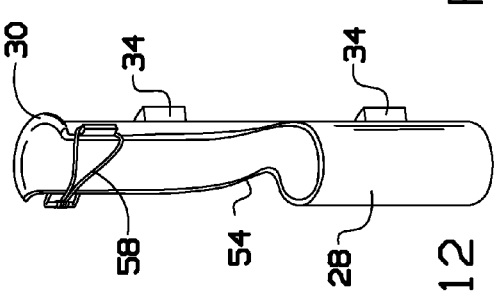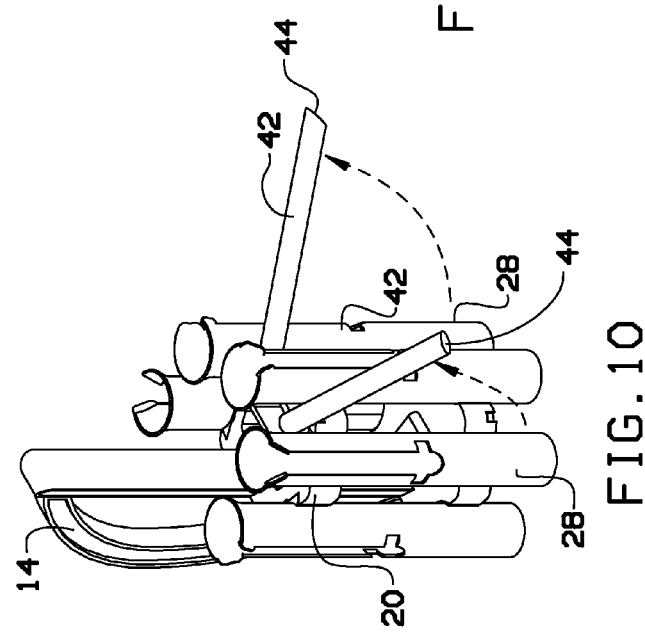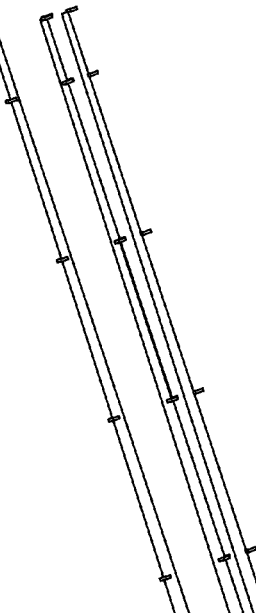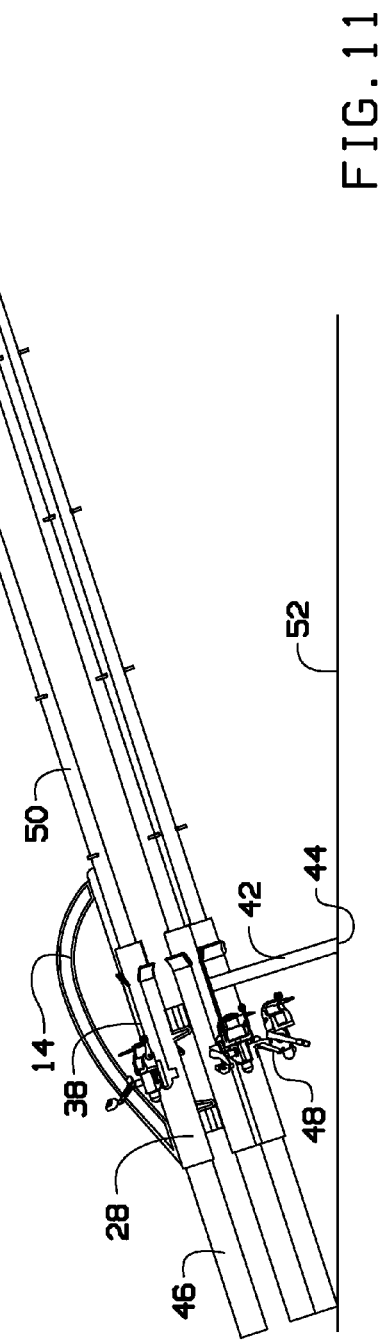

200~# PORTABLE FISHING ROD HOLDER WITH LEGS AND STAND

BACKGROUND OF THE INVENTION

The present invention relates to fishing accessories and, more particularly, to a portable fishing rod holder with legs and a stand.

According to the recreational boating and fishing foundation there are over 48 million anglers in the US alone who love to fish. By simply walking into a fishing store, one can see that rods and reels are not cheap, up to several hundred dollars in some instances. Handling fishing rods, especially multiple fishing rods, is not easy. Out on the water, they perform excellent, but getting there is a different story. Rods are designed perfectly for fishing, but not so much for transportation.

There is a good chance that an angler has to transport their rods and tackle to go fishing. For many people, that means carefully and constantly loading and unloading rods from vehicles and maneuvering constant obstacles such as hallways, doorways, garages, and docks, to name a few. Even if an angler is close to a fishing spot, there are still cases, where docks can stretch up to 50 yards or more.

While fishing rods are designed to have great downward pulling strength, their ceramic rings, rollers, tips, and expensive reels and not designed to take direct contact and can damage and break very easily. Most anglers have had to replace rings and broken rods all together and typical damage almost always happens during transportation.

The problem is that there are really only two ways to carry fishing rods, and both ways have inherent problems and regularly damage rods and reels. The first and most common way is to grab the rods down around the bottom handle or griping around the reel bracket, keeping the rods out in front, and the second way to grab fishing rods is from the top, around the guides where the rod is slim and flexible, keeping the rods vertical. What makes transporting rods difficult is the fact that they are so long, up to 7 feet or more in length, and their weight is unbalanced along their length, making it very difficult to find a comfortable handle while safely transporting them.

The first and most common method of carrying rods is by griping the bottom handle or around the reel, and it's somewhat comfortable but it puts the rod tips way out in front of you, about 5-6 feet or more. With the rods tips that far out in front, they are more likely to strike objects and break as you transport them. Not to mention that holding more than one or two rods like this becomes extremely difficult and uncomfortable.

The second method for carrying rods is by griping them high up around the top third of the rods where they are slim and you can carry more rods. The problem is that the expensive reels are left dangling below banging against each other and causing damage. Another problem with this method is scratching gimbals on the floor and then damaging tips as a result from holding rods too high indoors. Tangling lines and tackle are also always a danger with either of these carrying methods and that can lead to serious delays and time lost not fishing.

Therefore, one method holds from the bottom and the other method holds from the top, but both methods are flawed, because the ideal place to hold a rod from is the midsection. This would keep the rod tips closer to you and the gimbals high off the ground, the problem is that the natural design of fishing rods makes it almost impossible to comfortably and efficiently hold and transport a fishing rod from its midsection.

Conventional portable fishing rod holders on the market are designed to either carry the rods horizontally or vertically. These designs end up placing the rod tips too far out in front or too high up over the user, which can lead to broken rod tips and decreased maneuverability.

Other conventional designs are difficult to store, place reels too close to each other, and often do not offer any means to protect the rods when not in transport. Many of the conventional designs cannot carry larger rods with conventional reels that are very commonly used in most forms of fishing.

As can be seen, there is a need for an improved portable fishing rod holder having legs and a stand.

SUMMARY OF THE INVENTION

In one aspect of the present invention, a portable fishing rod holder comprises a plurality of rod holders; at least one base plate having attachment sections for each of the plurality of rod holders, where the plurality of rod holders are removably attached to the attachment sections; a handle rail removably supporting the at least one base plate; a handle extending from one side of the handle rail opposite from the side where the at least one base plate is attached; and first and second legs pivoting from the at least one base plate.

In another aspect of the present invention, a portable fishing rod holder comprises a plurality of rod holders formed as open tubular members having a flared upper end; a first and second base plate having attachment sections for each of the plurality of rod holders, where the plurality of rod holders are removably attached to the attachment sections; a handle rail removably supporting the first and second base plates; a handle extending from one side of the handle rail opposite from the side where the first and second base plates are attached; and first and second legs pivoting from one of the first and second base plates, wherein the handle extends a distance away from the handle rail that is greater than a diameter of the rod holders.

These and other features, aspects and advantages of the present invention will become better understood with reference to the following drawings, description and claims.

BRIEF DESCRIPTION OF THE DRAWINGS

FIG. 6 is a perspective view of the portable fishing rod holder of FIG. 1 with the rod holders removed;

FIG. 7 is a perspective view of a base plate of the portable fishing rod holder of FIG. 1;

FIG. 8 is a perspective view of a rod holder of the portable fishing rod holder of FIG. 1;

FIG. 9 is a perspective view of a leg of the portable fishing rod holder of FIG. 1;

FIG. 10 is a perspective view of the portable fishing rod holder of FIG. 1 illustrating the legs moved into a stand configuration;

FIG. 11 is a side view of the portable fishing rod holder of FIG. 1, in use, in a stand configuration;

FIG. 12 is a perspective view of an alternate rod holder configuration; and

FIG. 13 is a perspective view of another alternate rod holder configuration.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a portable fishing rod holder for housing fishing rods that can be used during transportation to and from fishing. The portable fishing rod holder can hold multiple fishing rods. The combination of a deep cut rod holder and an extra-long handle allow the rods to be carried in a perfect diagonal position, lower and closer to the user for increased comfort and user maneuverability, as well as for increased protection of rods and reels. The portable fishing rod holder has built-in legs, a home stand option, and the ability to hold and carry larger rods with conventional reels.

Figure 1:
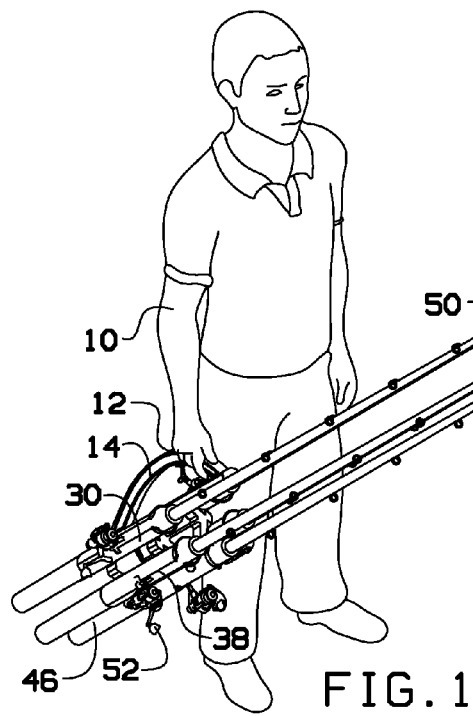
FIG. 1 is a perspective view of a portable fishing rod holder, in use, according to an exemplary embodiment of the present invention.
Figure 2:
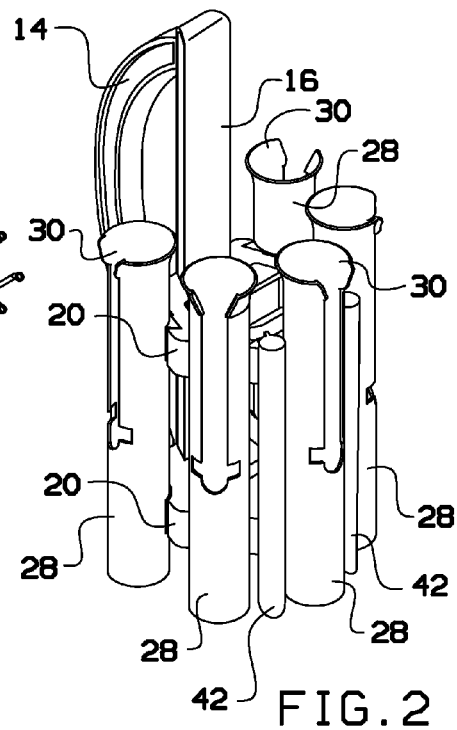
FIG. 2 is a perspective view of the portable fishing rod holder of FIG. 1.
Figure 3:
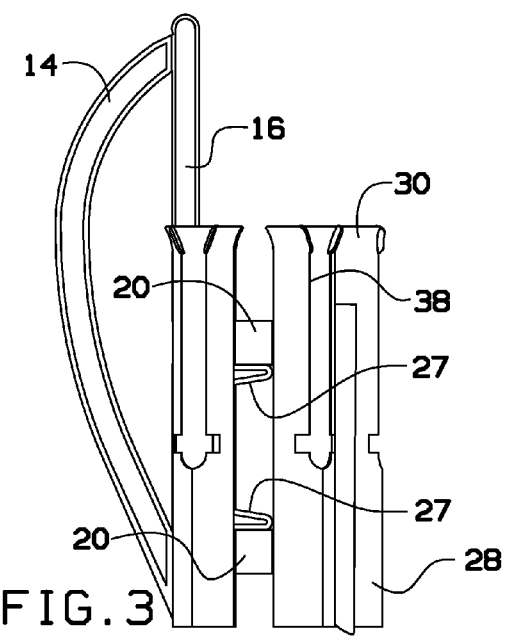
FIG. 3 is a side view of the portable fishing rod holder of FIG. 1.
Figure 4:
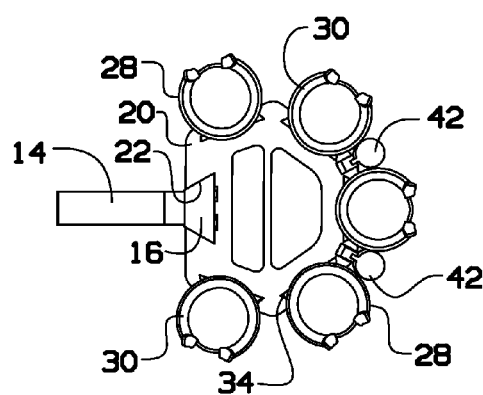
FIG. 4 is a top view of the portable fishing rod holder of FIG. 1.
Figure 5:
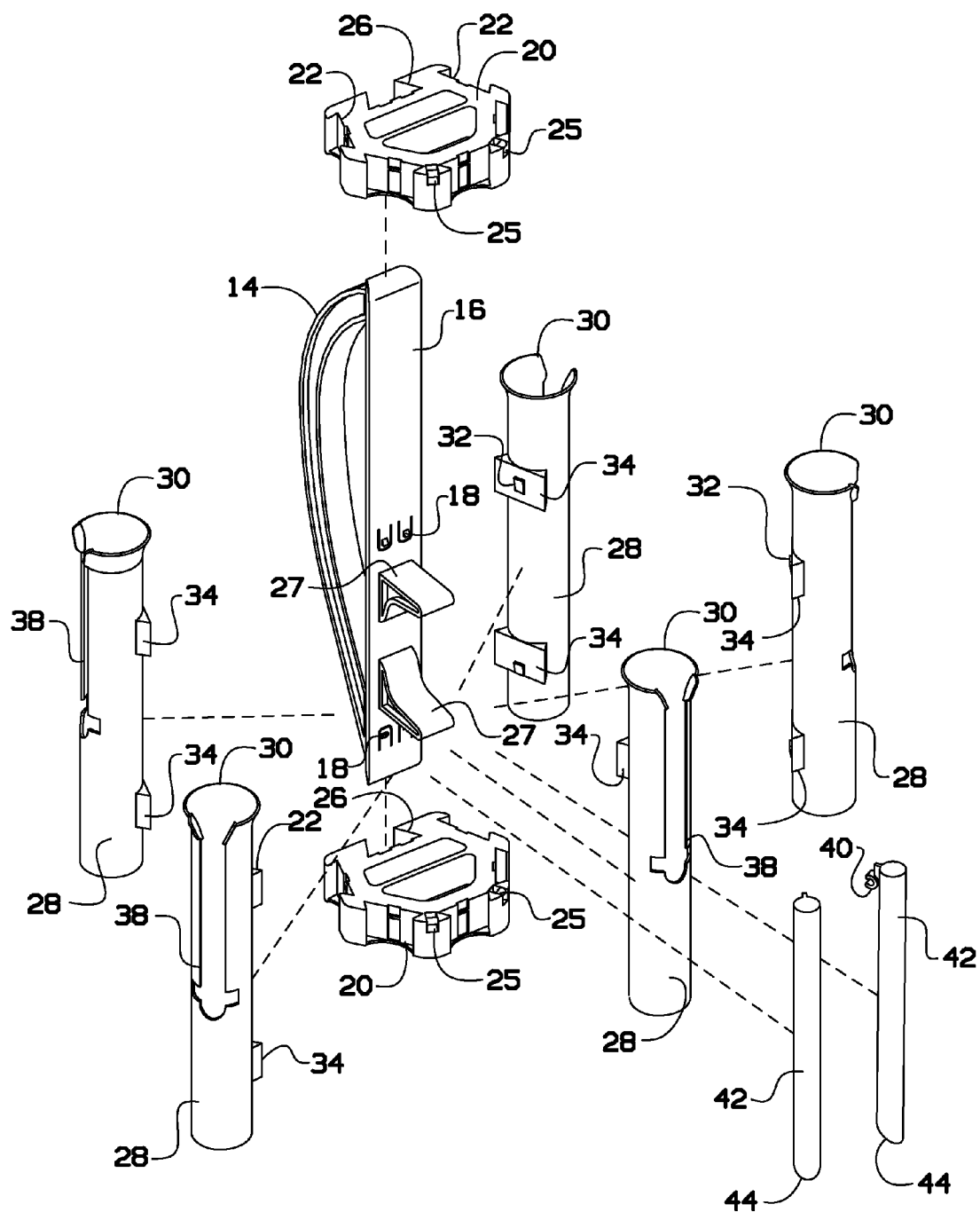
FIG. 5 is an exploded perspective view of the portable fishing rod holder of FIG. 1.

Referring now to FIGS. 1 through 11, a portable fishing rod holder can include a plurality of rod holders 28 adapted to carry a fishing rod 50 therein. The rod holders 28 can be open tubular members typically from about 8 to 16 inches long and from about 1 to 3 inches in diameter. A holder reel notch 38 can be extend from an upper end of the rod holder 28 to a depth from about 30 percent to about 70 percent of the length of the rod holder 28. The holder reel notches 38 permit reels 48 mounted to the rods 50 to slip into the holder reel notches 38. The rod handles 46 can extend out a bottom end of the rod holders 28. The top end of the rod holders 28 can include a flared end 30, providing a larger diameter for inserting the rod handles 46 therein when placing the rod 50 in the rod holder 28.

The size and shape of the rod holders 28 can vary depending on application. In some embodiments, as shown in FIGS. 12 and 13, an enlarged holder reel notch 54 can be provided to accept larger reels into the rod holder 28. A rod securing mechanism, such as a reel notch clip arm 56 or a reel notch elastic banding 58, can be disposed near the flared end 30 of the rod holder. These elements can take various forms, such as elastic members, straps, buckles, hook and loop fasteners, or the like, provided that they can extend across from one side of the enlarged holder reel notch 54 and be secured to the other side of the enlarged holder reel notch 54 when the rod 50 is inserted therein.

The rod holders 28 can attach to one or more base plates 20, typically, the rod holders 28 attach to two base plates 20. Typically, the rod holders 28 can be removed from and reattached to the base plates 20. The base plates 20 can include a plurality of base plate holder notches 22 with base plate holder notch tooth ledges 24 disposed in each. The rod holders 28 can include a holder rail 34 with a holder rail locking notch teeth 32 disposed thereupon. The holder rail 34 can be engaged with the base plate holder notch 22, allowing the base plate holder notch 24 to engage with the holder rail locking notch tooth 32, securing the rod holder 28 to the base plate 20. In some embodiments, the holder rail 34 and the base plate holder notch 22 can be dovetail shape.

The base plates 20 can be removably attached to a handle rail 16 in a similar manner as the rod holders 28 to the base plate 20. More specifically, the base plates 20 can include a base plate hand rail notch 26 having one or more base plate holder notch tooth ledges 24 disposed therein. The handle rail 16 can include handle rail locking notch teeth 18 adapted to engage with the base plate holder notch tooth ledges 24 disposed in the base plate hand rail notch 26. A base plate support bracket 27 can be disposed on the handle rail 16 to further support the base plates 20 on the handle rail 16.

A handle 14 can attach to the handle rail 16 opposite where the base plates 20 attach to the handle rail 16. The handle 14 can be an elongated handle and can extend away from the base plate 16. The handle 14 can be several inches taller than the rod holders 28. In other words, wherein the handle 17 can extend a distance away from the handle rail 16 that is greater than a diameter of the rod holders 28. This extra length of the handle 14, along with the extra depth of the rod holders 28 give the user 10 an extra foot of so of length when carrying the fishing rods 50 in the product of the present invention. This means that the fishing rods 50 can rest a foot or so lower than the user's arm length would normally allow, bringing the fishing rods 50 lower and closer to the user 10 during transportation, which makes them safer and easier to maneuver without damaging rod tips on ceilings or tight hallways. The design in essence allows the user to carry the rods from the most secure spot on the rods, the bottom, while actually griping the product approximately in-line with the center of the rods, which is the safest place to carry the rods but least practical because of the way fishing rods have an unbalanced design with the thin tapered tips and large heavy bases. Another feature of the tall handle 14 is its half circle shape where the user grips the product. This rounded design allows the user to find his or her most comfortable spot to hold the product to create the most beneficial angle for the fishing rods extending out in front of the user to increase the user's maneuverability and protection for the rods.

Legs 42 can be attached to the product in the front of the base plates 20 and can be removed as needed. The legs 42 can lay flush with the rod holders 28 and can be set one on each side of the center rod holders.

When needed, legs 42 can extend out or can be totally removed and attached as needed, pivoting, for example, at a 90 degree angle from leg pivot brackets 40 disposed on the base plate 20. The legs 42 can include angled feet 44 for aligning with a surface 52 when the portable rod holder is placed on the surface 52 as shown in FIG. 11. The two extended legs 42 and the bottom of the fishing rod handles 46 act to support the product and fishing rods 50 stationary at a low diagonal angle.

A home stand (not shown) can be designed so the entire product can be placed on it, fully loaded with rods, when the user returns from fishing. The rods can even be cleaned in the home stand. The concept is to allow the user to return home from fishing and leave the next day without even removing the rods from the portable rod holder. All he/she must do is place it in the home stand when they get home and grab it on the way out the next day of fishing.

A wall mount rod holder stand (not shown) can be designed as two flat strip bases that mount to a wall or side of a boat and accept the same notch style rod holders 28 as the product so the user can release the individual rod holders 28 from the product and slide them into the wall stand as needed, and vice versa.

The portable rod holder of the present invention is designed to fill two purposes—to protect expensive fishing tackle like rods, reels, fishing guides, tips, and the like during transportation both in the user's hands and also when placed in the car, SUV, truck, boat, and garage. The other purpose of the portable rod holder of the present invention is to increase angler efficiency and decrease preparation time and trips to the car or garage and back and forth. By doing so the product also reduces strain on the user and increases productivity and comfort.

The portable rod holder of the present invention can be made by hand one at a time or can be mass produced by various methods, such as by using molds to produce all the components out of polyethylene (PP), or other suitable material, and then attach all the parts together during production. The parts can even be sold separately and connected together by the user.

To use the portable rod holder of the present invention, the angler can grab this product before going fishing and insert their fishing rods by sliding each one inside the individual rod holders, typically from about 3 to about 6 fishing rods can be carried, much more than possible by hand. The angler can even include large fishing rods with conventional fishing reels for large tackle thanks to the custom design conventional rod holders available on the product. The angler can then carry up to 10 fishing rods through his house, garage, yard, dock, or the like, more efficiently and comfortably than ever thought possible without damaging and rod tips, guides, expensive reels, or tangling any lines. This decreased prep time leads to increased fishing time. But if the angler needs to stop for whatever reason along the way, all they must do is extend the two legs on the front plate and they can rest the entire product, loaded with fishing rods, on the ground at a comfortable angle, keeping the reels off the ground and the handle up and ready to go. This stationary position is also great for washing down rods at the end of the day or even preparing fishing lines, tackle, and tying knots. When the angler is ready to move again all they must do is grab the handle and pick up several pounds of rods and reels comfortably with one hand. The rounded shape of the extra-long handle and deep cut rod holders combine to place the rods at the ideal carrying position and angle for transportation; low to the ground and close to the angler to protect the tackle and increase maneuverability. This saves the problem of broken rod tips and tangled lines that can delay trips and cost money. Another problem the angler avoids, apart from carrying multiple fishing rods long distances, like bridges and docks, is transporting fishing rods in a vehicle. The angler solves this problem by keeping all his fishing rods tightly confined inside his holder which fits perfectly in almost all trucks and SUVs while using the legs and even standard cars with the legs retracted.

The portable rod holder of the present invention can include other accessories, such as a storage region for storing tackle and the like. This storage region could be disposed, for example, between the two base plates 20, or above the top base plate 20. In some embodiments, a tackle holder can replace one or more of the rod holders 28 and attach to the base plates 20 in a manner similar to the rod holders 28.

It should be understood, of course, that the foregoing relates to exemplary embodiments of the invention and that modifications may be made without departing from the spirit and scope of the invention as set forth in the following claims.

What is claimed is:

1. A portable fishing rod holder comprising:
   a plurality of rod holders;
   at least one base plate having attachment sections for each of the plurality of rod holders, where the plurality of rod holders are removably attached to the attachment sections;
   a handle rail removably supporting the at least one base plate;
   a handle extending from one side of the handle rail opposite from the side where the at least one base plate is attached;
   holder rails having holder rail locking notch teeth in each of the plurality of the rod holders, wherein the holder rails engage with base plate holder notches formed in the at least one base plate; and
   first and second legs positionable to extend from the at least one base plate.

2. The portable fishing rod holder of claim 1, wherein the plurality of rod holders are formed open tubes having a holder reel notch extending from a top end thereof.

3. The portable fishing rod holder of claim 2, further comprising an attachment mechanism spanning across an upper portion of the holder reel notch.

4. The portable fishing rod holder of claim 1, further comprising a flared end on a top end of each of the plurality of rod holders.

5. The portable fishing rod holder of claim 1, wherein the at least one base plate includes two base plates attached to the handle rail.

6. The portable fishing rod holder of claim 1, wherein the handle extends a distance away from the handle rail that is greater than a diameter of the rod holders.

7. A portable fishing rod holder comprising:
   a plurality of rod holders formed as open tubular members having a flared upper end;
   a first and second base plate having attachment sections for each of the plurality of rod holders, where the plurality of rod holders are removably attached to the attachment sections;
   a handle rail removably supporting the first and second base plates;
   a handle extending from one side of the handle rail opposite from the side where the first and second base plates are attached;
   holder rails having holder rail locking notch teeth in each of the plurality of the rod holders, wherein the holder rails engage with base plate holder notches formed in the at least one base plate; and
   first and second legs positionable to extend from one of the first and second base plates, wherein
   the handle extends a distance away from the handle rail that is greater than a diameter of the rod holders.

8. The portable fishing rod holder of claim 7, further comprising an attachment mechanism spanning across an upper portion of the holder reel notch.

9. A portable fishing rod holder comprising:
   a plurality of rod holders, wherein the plurality of rod holders are formed open tubes having a holder reel notch extending from a top end thereof;
   an attachment mechanism spanning across an upper portion of the holder reel notch;
   at least one base plate having attachment sections for each of the plurality of rod holders, where the plurality of rod holders are removably attached to the attachment sections;
   a handle rail removably supporting the at least one base plate;

a handle extending from one side of the handle rail opposite from the side where the at least one base plate is attached; and first and second legs positionable to extend from the at least one base plate.

10. The portable fishing rod holder of claim 9, wherein the plurality of rod holders are formed open tubes having a holder reel notch extending from a top end thereof.

11. The portable fishing rod holder of claim 9, further comprising a flared end on a top end of each of the plurality of rod holders.

12. The portable fishing rod holder of claim 9, wherein the at least one base plate includes two base plates attached to the handle rail.

13. The portable fishing rod holder of claim 9, further comprising holder rails having holder rail locking notch teeth in each of the plurality of the rod holders, wherein the holder rails engage with base plate holder notches formed in the at least one base plate.

14. The portable fishing rod holder of claim 9, wherein the handle extends a distance away from the handle rail that is greater than a diameter of the rod holders.

\* \* \* \* \*